United States Patent [19]
Kubota et al.

[11] 4,289,400
[45] Sep. 15, 1981

[54] APPARATUS FOR MEASURING A GRADIENT OF A SURFACE

[75] Inventors: Shigeo Kubota; Tadao Ishihara; Masahiro Kikuchi, all of Tokyo, Japan

[73] Assignee: Sony Corporation, Tokyo, Japan

[21] Appl. No.: 119,354

[22] Filed: Feb. 7, 1980

Related U.S. Application Data

[63] Continuation-in-part of Ser. No. 882,230, Feb. 28, 1978.

[30] Foreign Application Priority Data

Mar. 8, 1977 [JP] Japan .................................. 52-137

[51] Int. Cl.³ ..................... G01B 11/24; G01B 11/26
[52] U.S. Cl. ................................ 356/376; 356/371; 356/445
[58] Field of Search ............... 356/124, 138, 152–153, 356/237, 371, 375–376, 400, 445, 448

[56] References Cited

U.S. PATENT DOCUMENTS

| | | | |
|---|---|---|---|
| 3,614,238 | 10/1971 | Stites | 356/124 |
| 3,857,637 | 12/1974 | Obenreder | 356/371 |
| 3,909,131 | 9/1975 | Waters | 356/375 |

FOREIGN PATENT DOCUMENTS 236024  6/1969  U.S.S.R. ............................. 356/371

OTHER PUBLICATIONS

Wong; G. S. K., "A Sensitive Null-Setting Angle Detector", Jr. of Physics E(G.B.), vol. 4, 3-1971, pp. 195-197.

Primary Examiner—William H. Punter
Attorney, Agent, or Firm—Hill, Van Santen, Steadman, Chiara & Simpson

[57] ABSTRACT

An apparatus for continuously measuring a gradient of a curved surface at a number of different points thereon is disclosed in which a laser beam reflected at the point to be measured on the surface makes a beam spot on a photo sensor. The photo sensor follows the beam spot while the center of the beam spot and the center of the photo sensor coincide. The displacement between the beam spot from the point subjected to measurement and the beam spot from a reference point on the surface of the photo sensor is proportional to the gradient at the point subjected to measurement. The photo sensor is, for example, a differential type which comprises four photo diodes. The numerical control table is used to determine the positional relationship of the point to be measured with respect to the laser beam and an X-Y recorder is used to follow the beam spot.

7 Claims, 3 Drawing Figures

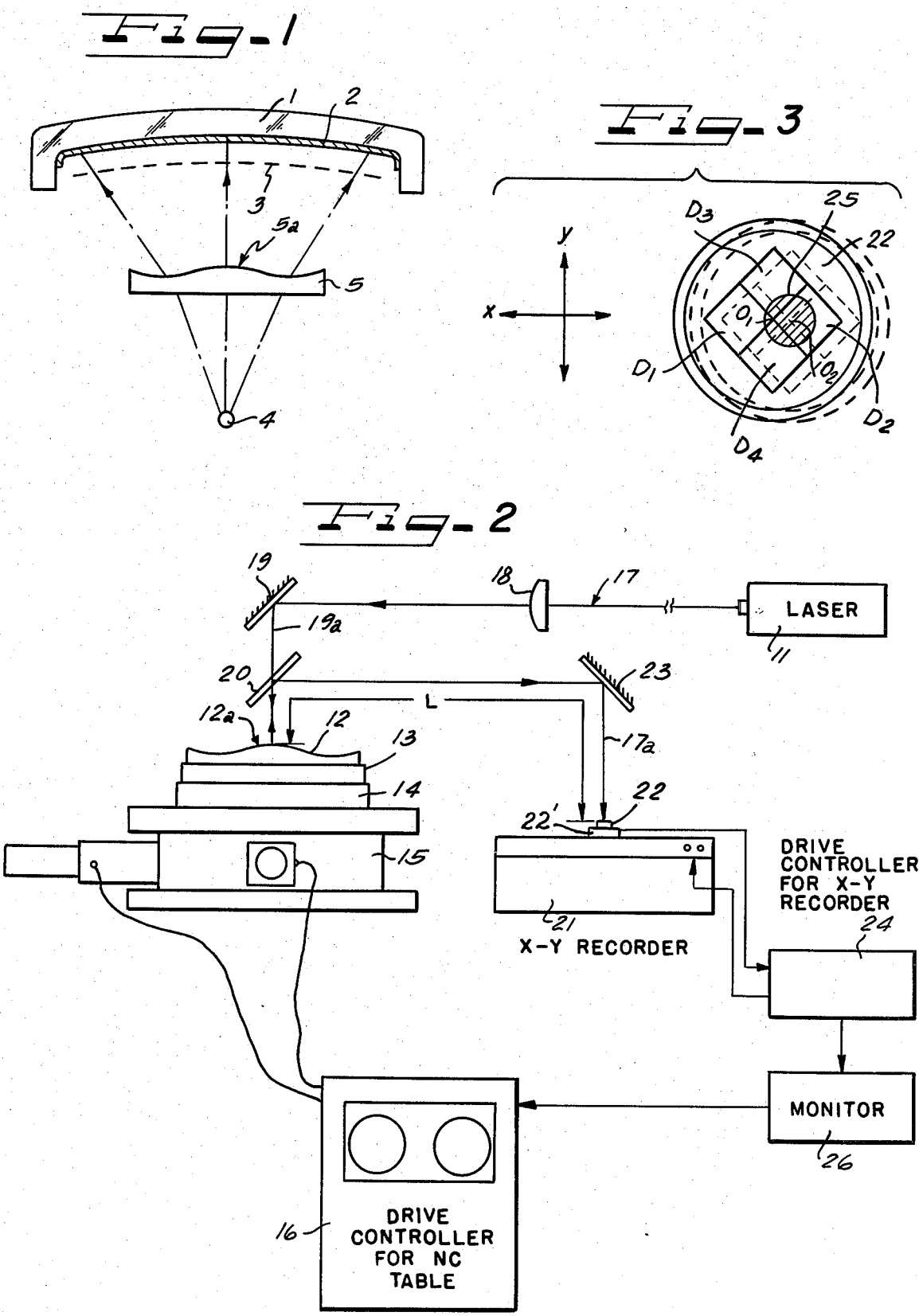

APPARATUS FOR MEASURING A GRADIENT OF A SURFACE

REFERENCE TO RELATED APPLICATION

This application is a continuation-in-part of our Ser. No. 882,230, filed Feb. 28, 1978.

BACKGROUND OF THE INVENTION

1. Field of the Invention

The present invention relates to an apparatus for measuring the gradient of a surface continuously with high accuracy.

In the manufacture of a phosphor screen of a color television picture tube, a slurry of red phosphors is coated on an inner surface of the face plate of the picture tube. A glass lens simulating the actual electron lens of the picture tube is mounted in front of the inner face plate of the picture tube and light is then projected through the lens where it is caused to strike on the regions of the phosphor and a color selecting grid (apertured grill or shadow mask) where it is caused to strike on the regions of the phosphor coating where the red phosphors should be. Light causes the slurry of red phosphors to be hardened, and the remaining slurry is then washed away. The process is then repeated by applying a green slurry to the inner surface of the face plate. The areas where the green phosphors are to appear in final form is then hardened by projecting a light through another lens and the remaining portions of the green slurry which have not been hardened are washed away. The process is then repeated for a third time for a blue phosphor. This is all diagrammatically shown in FIG. 1 of the drawings, where slurries of phosphors 2 are applied to the inner face of the face plate of the picture tube. 5 represents the lens, and 4 is the light source. The surface 5a of the lens 5 is curved so that light will fall on the phosphor regions of the phosphors after passing through a grid electrode or shadow mask 3. It is very important that the curvature of the face of the lens in front of the grid electrode or shadow mask have the gradients of this surface maintained within very close limits. In selecting a lens 5 for this operation, it is important that the surface be examined to determine its relative quality.

It will thus be understood that it is important that to correct the error caused by the approximation by light of the electron beam trajectory be accurately maintained.

2. Description of the Prior Art

In the prior art, it has been very difficult to measure the gradient of an arbitrary point on the curved surface, and it is impossible to control the quality of the corrective lens sufficiently to provide a proper quality of the picture screen.

In the prior art, there are disclosed several techniques to measure the physical dimensions directly or indirectly related to the gradient of a curved surface at many different selected points thereon. One method has been to measure the thickness of the lens mechanically by using a dial gauge. In this case, to convert the measured value of thickness into a gradient value, it is necessary to employ a very high density and precise sampling, which was not easy for such mechanical measurements. Furthermore, in this method, a needle directly contacts the curved surface of the lens, and thus the antireflective coating on the surface of the lens may be damaged by the needle.

Another optical measure of the angle has been disclosed in the prior art by using an auto collimator, but in this process, it was found difficult to obtain an image of the surface with sufficient light because it is required to restrict the field of vision to a small area, to measure the curved surface in which the gradient changes continuously. This was particularly true where the corrective lens is used in optical printing of a phosphor screen of a color television picture tube, since the gradient value is distributed in the range of a factor of $\pm 10$ milliradians. Commercially available auto collimators were not usable because the angles of the coverage of the measurement are different.

A projection method for using a collimated laser beam is also known in the prior art for the quality examination of the lens. In this case, the lens is covered by a mask except at particular points being examined through which the laser beam passes to make images on a photographic emulsion. But in this case, it is necessary to provide a mask, and it is impossible to examine each surface individually because light passing through the lens is used.

SUMMARY OF THE INVENTION

It is an object of the present invention to provide apparatus for measuring the gradient of a curved surface at a number of different points thereon.

It is another object of the present invention to provide an improved apparatus for measuring the gradient, which apparatus can be used to measure precisely, continuously and automatically the gradient at these various surface points.

It is a further object of the present invention to provide an apparatus for measuring the gradient of a curved surface at different points thereon which is especially suitable for quality control of a corrective lens used in optical printing systems employed in the manufacture of phosphor screens of a color television picture tube.

Apparatus embodying the present invention comprises a light beam source such as one for generating a laser beam which is focused on a selected point on the surface of a body such as a lens, whose gradient at that point is to be measured. The beam is projected to a point on the surface of the body, whose gradient is to be determined, and where a portion of the light beam is reflected to make a beam spot on the plane remote from the surface. A photo sensor means provided on this plane is caused to follow the beam spot while the photo sensor and the beam spot coincide with each other. Read-out means is provided to read out signals representing positions of the beam spot on said plane to be converted into a gradient of said selected point with respect to the reference plane.

In a preferred form of the present invention, the lens being examined is carried on a numerical control (NC) table, where it can be moved in such directions that the laser beam can be made to fall on different selected points on the curved surface of the lens where the gradient is to be measured. The reflected laser beam is caused to impinge on the half mirror and again on a second mirror, where it then reaches a photo sensor which is mounted on an X-Y recorder, movable in two directions, namely the X direction and the Y direction. A drive controller moves the photo sensor until the reflected beam spot coincides with the center of the photo sensor. Once the photo sensor and the beam spot coincide with each other, the photo sensor follows the beam spot even if the beam spot moves around the X-Y recorder. A pair of voltages are recorded which can be converted into the gradient of the point from which the laser beam was reflected.

BRIEF DESCRIPTION OF THE DRAWINGS

FIG. 1 is a schematic illustration which shows an optical printing system performing the phosphor color pattern on the inner surface of the face plate of a color television picture tube, which optical printing system uses a corrective lens, the corrective lens being of the type whose surface gradients at different points are to be measured by the apparatus of the present invention;

FIG. 2 is a schematic diagram of the apparatus of the present invention for measuring the gradient of the surface thereof at different points thereon; and FIG. 3 illustrates diagrammatically a photo sensor which is employed in the apparatus of the present invention.

DESCRIPTION OF THE PREFERRED EMBODIMENTS

As diagrammatically shown in FIG. 2, a laser beam generator 11, for example, He-Ne gas laser, is provided at a fixed position. The lens 12 which is to be checked is supported on a table 13 in a predetermined position expressed in X and Y coordinates, this table 13 which in turn is carried on a rotatable stage 14 of a numerical control table 15, the table 15 being hereinafter referred to as an "NC table". Movement of the rotatable stage is under control of the NC table and is arranged to position the lens 12 in a predetermined position expressed by X-Y coordinates. The lens may thus be moved in a plane in X and Y directions in accordance with control signals from a drive controller 16. The laser generator 11 produces a beam 17 which passes through a lens 18. Thereafter, the beam is reflected by a mirror 19 in the direction of the table 13. The reflected beam passes then through a half mirror 20 until it strikes a point on the surface 12a of the lens 12. The beam is then reflected back by the lens until it strikes the half mirror 20. The reflected laser beam from the lens 12 is reflected by the half mirror 20 in a direction to strike a mirror 23. At this point, the beam is deflected downwardly, as at 17a, to form a spot at a plane on an X-Y recorder 21. A photo sensor 22 is carried on a movable pen holder 22' of the X-Y recorder 21. The holder 22' is arranged to be moved in either the X direction or the Y direction under control of a drive controller 24 until the center of the photo sensor 22 is aligned with the center of the spot made by the reflected laser beam.

The photo sensor 22 is provided in order to detect the displacement of the beam spot at a so-called pen position in the X-Y recorder, where a pen would be usually mounted. If the photo sensor 22 is manually positioned about the first position of the beam spot, the photo sensor 22 is moved to a position where the center of the sensor coincides with the center of the beam spot, upon receipt of the light spot on the surface of the photo sensor. This movement is caused by the feedback of the signals which indicate the displacement of the light spot from the sensor through a servo-circuit contained in a drive controller 24 for the X-Y recorder 21. This photo sensor 22 to detect the displacement of the beam spot is, for example, a differential type photo sensor comprising four photo diodes $D_1$, $D_2$, $D_3$ and $D_4$ (see FIG. 3). In this case, a difference signal between the photo diodes $D_1$ and $D_2$, based on the displacement of the beam spot is fed back into an X-input of the X-Y recorder which controls the movement of the photo sensor in the X direction. Similarly, a difference signal between the photo diodes $D_3$ and $D_4$ is fed back to a Y-input of the X-Y recorder which controls the movement of the photo sensor in the Y direction. Accordingly, when the initial positional relationship between the photo sensor 22 and the beam spot 25 (FIG. 3) when the laser beam arrived at the photo sensor 22, is shown by solid lines in FIG. 3, the photo sensor is moved by moving the holder 22' carrying the photo sensor to the position where the difference signal in the X direction as obtained from the photo diodes $D_1$ and $D_2$ and the difference signal in the Y direction as obtained from photo diodes $D_3$ and $D_4$ become zero. In other words, the photo sensor 22 is moved to a position where the center of the photo sensor $O_1$ and the center of the light distribution $O_2$ coincide with each other as shown by the dotted lines in FIG. 3. Once the photo sensor 22 and the beam spot coincide with each other, the photo sensor 22 follows the beam spot with its center $O_1$ coinciding with the center of the light distribution $O_2$ even if the beam spot moves around the plane of the X-Y recorder.

In this arrangement, the displacement $\Delta l$ between the beam spot from a point subjected to measurement on the lens 12, and the beam spot from the reference point on the lens is proportional to the gradient of the curved surface at this point, as long as the reflected beam from the reference point is perpendicular to the plane on which the photo sensor moves, that is, the plane on which the displacement $\Delta l$ is measured. This relationship is represented as follows:

$$|\Delta l| = L \tan 2\theta \approx 2L\theta \quad (\theta << 1) \tag{1}$$

where L is the length of the light path between the reference point on the lens 12, and the photo detector which corresponds to the beam spot of the reference point. $\theta$ is a gradient at the point on the lens surface where gradient is being measured. The relationship is readily understood by imagining a mirror image of the reference point and the point subjected to measurement by the mirror 20, and mirror images of the beam spots from the points subject to measurement and the reference points by the mirror 23. The image of the reference point and the point subjected to measurement is substantially identical, since the laser beam is fixed, and the measuring point is moved to the position of the reference point upon measuring the point. There is a very small deviation of the height of the lens between the reference point and the point subjected to measurement, but this deviation is negligibly small and can be neglected. Three points made by the above images of the point on the lens and the two beam spots make a right-angle triangle, having a top angle of $2\theta$ and two sides adjacent to the right angle having lengths of L and $\Delta l$, respectively.

In the case where the photo sensor moves on a plane which is inclined by an angle $\epsilon$ with respect to the plane perpendicular to the reflected laser beam from the reference point, the displacement $\Delta l$ is further multiplied by a correction coefficient which is a function of $\epsilon$ and $\theta$. The position of the beam spot on the X-Y recorder from the point subjected to measurement is read by a pair of input voltages of the X-Y recorder, when the beam spot coincides with the center of the photo sensor, is monitored by a monitor 26, and is recorded. By previously obtaining the relationship between the gradient value and the pair of input voltages which correspond to the position of the beam spot, the gradient of the lens surface at the selected point on the lens 12 is determined.

A signal which shows the completion of the determination of the position of the lens 12 carried on the NC table derives a pair of input voltages in the X-Y recorder which shows the coordinates of the photo sensor (i.e., the displacement is read out), and a signal which shows the termination of the output of the pair of input voltages for the X-Y recorder is a start signal for the positional movement of the NC table 15 to move the corrective lens to the next point to be measured.

In the above construction, first the lens 12 to be examined is positioned at a predetermined position relative to the incident laser beam by the NC table 15, and the laser beam 17 reaches a predetermined first point on the curved surface 12a of the lens 12, and the position of the photo sensor 22 which is provided on the surface of the X-Y recorder 21 is manually adjusted by a pair of zero-adjust knobs (not shown) of the X-Y recorder so that the laser beam is reflected to cause the beam spot to fall on the photo sensor 22 at the zero X and Y positions. The photo sensor 22 follows the beam spot until the center of the photo sensor coincides with the center of the beam spot based on the signal which indicates the ($\Delta X$ and $\Delta Y$) displacements of the photo sensor. Then the position of the beam spot is read out as the pair of input signals equal to $\Delta X$ and $\Delta Y$ for the X-Y recorder 21. Thus, the gradient of the first point on the surface of the lens 12 is measured and determined from these $\Delta X$ and $\Delta Y$ signals.

After the measurement of this first point is completed, the NC table 15 is automatically driven to move the lens 12 to be measured so that the laser beam 17 strikes a second point on the surface of the lens. While the lens is moved to the second position by the NC table, the beam spot may move around the X-Y recorder 21. However, the photo sensor 22 moves with its center coinciding with the center of the beam due to the automatic follow-up system. Similarly, the gradient at the second point is measured. By continuing the above procedure, the surface of the lens is scanned by the laser beam and the gradient of the individual points on the curved surface 12 is continuously measured. Thus, in the present invention the X-Y coordinates of the lens 12 is known from the position of the drive motors to the NC table and by moving the lens 12 to all desired positions one at a time at which the gradient of the surface is to be measured, the gradient for each point can be determined. For each known point the $\Delta X$ and $\Delta Y$ signals are determined and the gradient at that point is calculated from equation (1) using these signals. Of course, $\Delta l$ is obtained from the following equation: $\Delta l^2 = \Delta X^2 + \Delta Y^2$.

As mentioned above, according to the present invention, by using a reflection of the laser beam, it is possible to measure the gradient of the curved surface without damaging it, and it is also possible to measure the gradient of both sides of the lens independently. Further, by determining the positional relationship between the lens and the laser beam by using a numerical control, an arbitrary point on the surface to be measured can be selected quite easily and precisely.

It is also an advantage of the present invention that a beam spot of sufficient light intensity can be obtained without using a high output laser beam generator.

According to the apparatus of the present invention, it is possible to achieve a measurement of high accuracy, and a gradient as small as about 0.1 milliradian. This value means the displacement of the phosphor pattern of less than $1\mu$ is exposed through the corrective lens 12. Then when the apparatus of this invention is used to measure the gradient of the corrective lens, it is possible to achieve a high quality control and by selecting a suitable lens. After considering the measured results, it is possible to manufacture a phosphor screen of high accuracy.

The apparatus for measuring a gradient of the curved surface is applied to the measurement of the corrective lens used in the manufacturing process of the phosphor screen of a color cathode ray tube, but it is apparent that this apparatus is also applicable for measurement of a gradient of different points on the curved surface of other goods from which light can be reflected back.

Furthermore, in the example given, the laser beam was used, but other kinds of light sources can be used if they can project a parallel light beam having a small diameter with sufficient intensity. One example of such other light source is the combination of mercury light, slits and lens system.

It will be apparent to those skilled in the art that many modifications and variations may be effected without departing from the spirit and scope of the novel concepts of the present invention.

We claim as our invention:

1. Apparatus for determining the gradient at different points on the surface of an optical lens comprising, an NC table having a deck for supporting said lens, said deck being mounted for movement in one plane, a drive and controller therefor for moving said deck of said table in said plane, a light detector, a recorder having a deck upon which said light detector is mounted, said recorder having means to record the position of said recorder deck in X and Y coordinates, means for producing a beam of light and directing it normal to said deck toward a point on a surface of said corrective lens whose gradient is to be measured, a half mirror mounted at 45 degrees to the path of said light beam and said beam passing therethrough, a second mirror mounted at 90 degrees to said half mirror and laterally offset therefrom, said beam being reflected from said surface of said lens back to said half mirror where it is deflected to said second mirror and then again deflected to form a spot on said light detector, said recorder including means for moving said light detector until the center of said light detector coincides with the center of the deflected beam, said recorder including means to record the X and Y distances which said recorder deck was required to move from reference X and Y positions to bring the center of said light detector into coincidence with the center of said light spot falling on said light detector and including means for generating $\Delta X$ and $\Delta Y$ signals, a value $\Delta l$ obtained from which signals according to the equation: $\Delta l^2 = X^2 + Y^2$ is proportional to the slopes of the surface of said corrective lens at said selected point in the X and Y directions and a drive controller for causing movement of said deck of said NC table to cause said light beam to strike said lens at a different point on the surface thereof, so that the slope at said different point can be obtained upon movement of said recorder deck to a position where the center of said light spot coincides with said center of said light detector to obtain $\Delta X$ and $\Delta Y$ signals for said different point from which the gradient $\theta$ can be determined from the equation $\Delta l = L \tan 2\theta$, where L is the distance which said light beam travels from said lens to said light detector.

2. Apparatus as set forth in claim 1, wherein the plane of movement of said NC table deck is parallel to the plane of movement of the deck carrying said light detector.

3. Apparatus as set forth in claim 1, in which said beam of light is a laser beam.

4. Apparatus as set forth in claim 1, in which said photo detector comprises two pairs of diodes differentially connected.

5. Apparatus as set forth in claim 1, in which said beam of light which passes through said half mirror to said optical lens is perpendicular to the deck of said NC table.

6. Apparatus as set forth in claim 1, which includes a monitor connected between said controller of said X-Y recorder and said drive controller of said NC table, whereby said optical lens may be examined for gradients at successively different points on the surface of said lens.

7. A method of measuring a gradient of a surface comprising the steps of:
  (a) providing an object movable in a horizontal plane which is subjected to measurement of a gradient of the surface thereof;
  (b) illuminating a selected point on said surface by a vertical light beam, said light beam being reflected vertically at said selected point, then reflected horizontally and then reflected vertically to a photo detector;
  (c) a photo detector on a horizontal plane remote from said surface for detecting $\Delta X$ and $\Delta Y$ displacements on said horizontal plane between a spot of said reflected light beam from a reference position;
  (d) converting said $\Delta X$ and $\Delta Y$ displacements into gradients ($\theta$) at said selected point by using the equation $\Delta l = L \tan 2\theta$ where L is the distance the light beam travels between the object and the photo detector and where $\Delta l^2 = \Delta X^2 + \Delta Y^2$.

* * * * *